(12) United States Patent
Yang et al.

(10) Patent No.: US 11,297,634 B2
(45) Date of Patent: Apr. 5, 2022

(54) SYSTEMS, METHODS, AND MEDIA FOR SCHEDULING TRAFFIC OF A COMMUNICATION SESSION BETWEEN AN APPLICATION ON A WIFI NETWORK AND ANOTHER DEVICE

(71) Applicants: Yudong Yang, New York, NY (US); Vishal Misra, New York, NY (US); Daniel Rubenstein, New York, NY (US); Yuming Jiang, Trondheim (NO)

(72) Inventors: Yudong Yang, New York, NY (US); Vishal Misra, New York, NY (US); Daniel Rubenstein, New York, NY (US); Yuming Jiang, Trondheim (NO)

(73) Assignee: The Trustees of Columbia University in the City of New York, New York, NY (US)

( * ) Notice: Subject to any disclaimer, the term of this patent is extended or adjusted under 35 U.S.C. 154(b) by 188 days.

(21) Appl. No.: 16/332,635

(22) PCT Filed: Sep. 26, 2017

(86) PCT No.: PCT/US2017/053556
§ 371 (c)(1),
(2) Date: Mar. 12, 2019

(87) PCT Pub. No.: WO2018/058145
PCT Pub. Date: Mar. 29, 2018

(65) Prior Publication Data
US 2021/0289519 A1    Sep. 16, 2021

Related U.S. Application Data

(60) Provisional application No. 62/399,518, filed on Sep. 26, 2016, provisional application No. 62/470,094, filed on Mar. 10, 2017.

(51) Int. Cl.
*H04W 72/12* (2009.01)
*H04W 84/12* (2009.01)

(52) U.S. Cl.
CPC ........ *H04W 72/1257* (2013.01); *H04W 84/12* (2013.01)

(58) Field of Classification Search
CPC ............. H04W 72/12; H04W 72/1247; H04W 28/0268
See application file for complete search history.

(56) References Cited

U.S. PATENT DOCUMENTS 6,512,741 B1    1/2003  Kohzuki et al.
6,560,196 B1    5/2003  Wei
(Continued)

OTHER PUBLICATIONS

Ahmed et al., "A Utility Proportional Fairness Approach for Resource Allocation in 4G-LTE", in the Proceedings of the International Conference on Computing, Networking and Communications, Honolulu, HI, Feb. 3-6, 2014, pp. 1035-1040.
(Continued)

*Primary Examiner* — Jamal Javaid
(74) *Attorney, Agent, or Firm* — Byrne Poh LLP

(57) ABSTRACT

Scheduling traffic of a communication session between an application on WiFi and another device, by: receiving traffic of a first session; determining that the traffic belongs to a first classification; determining that a time allocated to the first classification times a second classification airtime is less than or equal to a time allocated to the second classification times a first classification airtime; selecting a counter associated with the first session as being the largest of multiple counters each associated with a different communication session of multiple communication sessions (which include the first session); determining that the traffic of the first session is to be scheduled for transmission to the application over WiFi in response to the counter being determined to be
(Continued)

the largest of the plurality of counters; and based on the traffic being determined to be scheduled, increasing the airtime associated with the first classification and decreases the counter.

18 Claims, 3 Drawing Sheets

(56) References Cited

U.S. PATENT DOCUMENTS

| | | | |
|---|---|---|---|
| 6,801,500 | B1 | 10/2004 | Chandran |
| 7,739,383 | B1 | 6/2010 | Short et al. |
| 8,483,194 | B1 | 7/2013 | Wu et al. |
| 10,687,341 | B2* | 6/2020 | Yang .................. H04W 28/0268 |
| 2003/0229714 | A1 | 12/2003 | Kiremidjian et al. |
| 2006/0218290 | A1* | 9/2006 | Lin ....................... H04L 67/322 |
| | | | 709/229 |
| 2009/0122808 | A1* | 5/2009 | Sharif-Ahmadi ........................... |
| | | | H04W 28/0273 |
| | | | 370/458 |
| 2012/0144063 | A1 | 6/2012 | Menchaca et al. |
| 2013/0100955 | A1 | 4/2013 | Dunlap et al. |
| 2013/0111038 | A1 | 5/2013 | Girard |
| 2014/0181293 | A1 | 6/2014 | Bhanage et al. |
| 2014/0269635 | A1 | 9/2014 | Shapira et al. |
| 2015/0215922 | A1 | 7/2015 | Bahk et al. |
| 2015/0222552 | A1* | 8/2015 | Uppunda .......... H04W 28/0268 |
| | | | 370/236 |
| 2015/0237525 | A1 | 8/2015 | Mildh et al. |
| 2015/0319270 | A1 | 11/2015 | Roeland et al. |
| 2016/0165475 | A1 | 6/2016 | Kim et al. |
| 2017/0111244 | A1 | 4/2017 | Strater et al. |
| 2017/0147553 | A1 | 5/2017 | Wang et al. |
| 2018/0026896 | A1 | 1/2018 | Szilagyi et al. |
| 2018/0103123 | A1 | 4/2018 | Skog et al. |
| 2018/0351852 | A1 | 12/2018 | Boucadair et al. |
| 2019/0082445 | A1 | 3/2019 | Yang et al. |
| 2019/0387451 | A1 | 12/2019 | Kucera et al. |
| 2020/0383158 | A1 | 12/2020 | Misra et al. |

OTHER PUBLICATIONS

Bahl et al., "Opportunistic Use of Client Repeaters to Improve Performance of WLANs", in IEEE Transactionson Networking, vol. 17, No. 4, Aug. 2009, pp. 1160-1171.
Bakre et al., "I-TCP: Indirect TCP for Mobile Hosts", Technical Report, Rutgers University, Department of Computer Science, Oct. 1994, pp. 1-18.
Balakrishnan et al., "A Comparison of Mechanisms for Improving TCP Performance over Wireless Links", in IEEE/ACM Transactions on Networking, vol. 5, No. 6, Dec. 1997, pp. 756-769.
Bethanabhotla et al., "Adaptive Video Streaming for Wireless Networks with Multiple Users and Helpers", in IEEE Transactions on Communications, vol. 63, issue 1, Jan. 2015, pp. 268-285.
Breiman, L., "Random Forests", in Machine Learning, vol. 45, issue 1, Oct. 2001, pp. 5-32.
Cardwell et al., "BBR: Congestion-Based Congestion Control", in ACM Queue: Networks, Sep. 2016, pp. 1-34.
Chiang et al., "Layering as Optimization Decomposition: A Mathematical Theory of Network Architectures", in Proceedings of the IEEE, vol. 95, issue 1, Jan. 2007, pp. 255-312.
Cisco Systems, "Quality of Service Networking", Technical Paper, IOS Technology Handbook, Oct. 16, 2012, pp. 1-31.
Cisco Systems, "Quality of Service Overview", Technical paper, Cisco IOS Quality of Service Solutions Guide, Release 12.2SR, Nov. 11, 2013, pp. 1-5.
Elaarag, H., "Improving TCP Performance Over Mobile Networks", in ACM Computing Surveys, vol. 34, No. 3, Sep. 2002, pp. 357-374.

Geier, E., "Quality of Service Explained: How Routers with Strong QoS Make Better Home Networks", in PC World, Oct. 9, 2014, pp. 1-6.
Georgiadis et al., "Efficeint Network QoS Provisioning Based on Per Node Traffic Shaping", in IEEE/ACM Transactions on Neworking, vol. 4, No. 4, Aug. 1996, pp. 482-501.
Gettys et al., "Bufferbloat: Dark Buffers in the Internet", in ACM Queue: Networks, vol. 9, issue 11, Nov. 2011, pp. 1-15.
Gollakota et al., "Clearing the RF Smog: Making 802.11n Robust to Cross-Technology Interference", in the Proceedings of the ACM Special Interest Group on Data Communication Conference, Toronto, CN, Aug. 15-19, 2011, pp. 1-12.
Gupta et al., "Scaling WiFi Performance for Large Audience Environments", in the Proceedings of the 8th International Conference on Emerging Networking Experiments and Technologies, Nice, FR, Dec. 10-13, 2012, pp. 217-228.
Ha et al., "CUBIC: A New TCP-Friendly High-Speed TCP Variant", in ACM SIGOPS Operating Systems Review, vol. 42, issue 5, Jul. 2008, pp. 64-74.
Hampel et al., "Seamless TCP Mobility Using Lightweight MPTCP Proxy" in the Proceedings of the 11th ACM International Symposium on Mobility Management and Wireless Access, Barcelona EP, Nov. 3-8, 2013, pp. 139-146.
International Search Report and Written Opinion dated Nov. 30, 2017 in International Patent Application No. PCT/US2017/053556.
Johansson, H., "Video Flow Classification: Feature Based Classification Using the Tree-Based Approach", Technical Paper, Karlstad University, Jun. 2016, pp. 1-95.
Jones et al., "Optimization and Root Finding (scipy.optimize)", SciPy.org, last updated May 5, 2018, pp. 1-8, available at: Jhttps://docs.scipy.org/doc/scipy/reference/optimize.html.
Kelly et al., "Rate Control for Communication Networks: Shadow Prices, Proportional Fairness and Stability", in the Journal of the Operational Research Society, vol. 49, issue 3, Mar. 1998, pp. 237-252.
Kim et al., "Enhanced Split TCP with End-to-End Protocol Semantics Over Wireless Networks", in the Proceedings of the IEEE Wireless Communications and Networking Conference, San Francisco CA, US, Mar. 19-22, 2017, pp. 1-6.
Kim et al., "On the Split-TCP Performance Over Real 4G LTE and 3G Wireless Networks", in IEEE Communications Magazine, vol. 55, issue 4, Apr. 2017, pp. 124-131.
Kopparty et al., "Split TCP for Mobile Ad Hoc Networks", in the Proceedings of the Global Telecommunications Conference, Taipei, TW, Nov. 17-21, 2002, pp. 1-5.
Kumar et al., "BwE: Flexible, Hierarchical Bandwidth Allocation for WAN Distributed Computing", in ACM SIGCOMM Computer Communication Review, vol. 45, Issue 4, Oct. 2015, pp. 1-14.
Le et al., "Experiences Deploying a Transparent Split TCP Middlebox and the Implications for NFV", in the Proceedings of the 2015 ACM SIGCOMM Workshop on Hot Topics in Middleboxes and Network Function Virtualization, London UK, Aug. 17-21, 2015, pp. 31-36.
Le et al., "Removing TCP Congestion Control on the Last Hop In Split TCP Environments", in the Proceedings of the 14th International Symposium on Modeling and Optimization in Mobile, Ad Hoc, and Wireless Networks, May 9-13, 2016, pp. 1-8.
Linksys, "Setting up QoS on a Linksys Wireless-N Router", Jul. 11, 2015, pp. 1-5, available at: https://www.linksys.com/us/support-article?articleNum=137079.
Maltz et al., "TCP Splice for Application Layer Proxy Performance", IBM Research Report, Mar. 17, 1998, pp. 1-19.
Mao et al., "Neural Adaptive Video Streaming with Pensieve", in Proceedings of the Conference of the ACM Special Interest Group on Data Communication, Los Angeles, CA, US, Aug. 21-25, 2017, pp. 197-210.
Mathis et al., "The Macroscopic Behavior of the TCP Congestion Avoidance Algorith", in ACM SIGCOMM Computer Communication Review, vol. 27, issue 3, Jul. 1997, pp. 67-82.
Mo et al., "Fair End-to-End Window-Based Congestion Control", in IEEE/ACM Transactions on Networking, vol. 8, No. 5, Oct. 2000, pp. 556-567.

(56) References Cited

OTHER PUBLICATIONS

Nossenson et al., "Application Classification in Cellular Backhaul Networks", in the Proceedings of the 17th IEEE International Conference on Networks, Singapore, GB, Dec. 14-16, 2011, pp. 219-224.
Nossenson et al., "On-Line Flows Classification of Video Streaming Applications", in Proceedings of the IEEE 14th International Symposium on Network Computing and Applications, Cambridge, MA, US, Sep. 28-30, 2015, pp. 251-258.
Oliveria et al., "An Adaptive Bandwidth Reservation Scheme for High-Speed Multimedia Wireless Networks", In IEEE Journal on Selected Areas in Communications, vol. 16, No. 6, Aug. 1998, pp. 858-874.
Padhye et al., "Modeling TCP Throughput: A Simple Model and its Empirical Validation", in Proceedings of the ACM SIGCOMM Conference, Vancouver, CA, Sep. 2-4, 1998, pp. 1-23.
Pathak et al., "Measuring and Evaluating TCP Splitting for Cloud Services", in the Proceedings of the International Conference on Passive and Active Network Measurement, Zurich, CH, Apr. 7-9, 2010, pp. 41-50.
Patro et al., "Observing Home Wireless Experience through WiFi APs", in the Proceedings of the 19th Annual International Conference on Mobile Computing & Networking, Miami, FL, US, Sep. 30-Oct. 4, 2013, pp. 339-350.
Poellabauer et al., "Energy-Aware Traffic Shaping for Wireless Real-Time Applications", the Proceedings of the Real-Time and Embedded Technology and Applications Symposium, Ontario, CN, May 28, 2004, pp. 1-8.
Poole, I., "IEEE 902.11 Wi-Fi Standards", Radio-Electronics.com, Jan. 28, 2010, pp. 1-5.
Pu et al., "New TCP Video Streaming Proxy Design for Last-Hop Wireless Networks", in the Proceedings of the 18th IEEE International Conference on In Image Processing, Brussels, BE, Sep. 11-14, 2011, pp. 2225-2228.
Rahmani et al., "Traffic Shaping for Resource-Efficient In-Vehicle Communication", In IEEE Transacitons on Industrial Informatics, vol. 5, No. 4, Nov. 2009, pp. 414-428.
Roseti et al., "Enhancing TCP Performance over Hybrid Wireless Terrestrial-Satellite Network", in the Proceedings of the 2009 First International Conference on Advances in Satellite and Space Communications, Colmar, FR, Jul. 20-25, 2009, pp. 19-23.
Schulz-Zander et al., "OpenSDWN: Programmatic Control over Home and Enterprise WiFi", in the Proceedings of the 1st ACM SIGCOMM Symposium on Software Defined Networking Research, Santa Clara, CA, US, Jun. 17-18, 2015, pp. 1-12.
Shafiq et al., "Network Traffic Classification Techniques and Comparative Analysis Using Machine Learning Algorithms", in the Proceedings of the 2nd IEEE International Conference on Computer and Communications, Chengdu CN, Oct. 14-17, 2016, pp. 2451-2455.
Shbair et al., "A Multi-Level Framework to Identify HTTPS Services", in the Proceedings of the IEEE Network Operations and Management Symposium, Istanbul TR, Apr. 25-29, 2016, pp. 240-248.
Spiteri et al., "BOLA: Near-Optimal Bitrate Adaptation for Online Videos", in the Proceedings of the 35th Annual IEEE International Conference on Computer Communications, San Francisco, CA, US, Apr. 10-14, 2016, pp. 1-12.
Sulaiman et al., "Investigation of QoS of Campus-Wide WiFi Networks", In the Journal of Telecommunications, vol. 2, No. 1, Feb. 2010, pp. 12-16.
Takeshita et al., "Evaluation of HTTP Video Classification Method Using Flow Group Information", in the Proceedings of the 14th International Telecommunications Network Strategy and Planning Symposium, Warsaw PL, Sep. 2010, pp. 1-6.
Tongaonkar et al., "Towards Self Adaptive Network Traffic Classification", in Computer Communications, vol. 56, Feb. 2015, 1-13.
Wi-Fi Alliance, "Wi-Fi Certified for WMM—Support for Multimedia Applications with Quality of Service in Wi-Fi Networks", Technical Paper, Sep. 1, 2004, pp. 1-15.
Xue et al., "The Performance Improvement in Optical Packet-Switched Networks by Traffic Shaping of Self-Similar Traffic", in Optical Fiber Communication Conference and Exhibit, Anaheim, CA, US, Mar. 2002, pp. 1-3.
Yavatkar et al., "Improving End-to-End Performance of TCP over Mobile Internetworks", in the IEEE First Workshop on Mobile Computing Systems and Applications, Santa Cruz, CA, IS, Dec. 8-9, 1994, pp. 146-152.
Zhang et al., "Network Traffic Classification Using Correlation Information", in IEEE Transactions on Parallel and Distributed Systems, vol. 24, vol. 1, Jan. 23, 2013, pp. 104-117.
Zhu et al., "Algorith 778: L-BFGS-B: Fortran Subroutines for Large-Scale Bound Constrained Optimization", in ACM Transactions on Mathematical Software, vol. 23, issue 4, Dec. 1997, pp. 550-560.
Chabanois, Y., "About, OpenMPTCProuter", Ycarus, last accessed Jun. 23, 2020, pp. 1, available at: https://www.openmptcprouter.com/about.
International Search Report and Written Opinion dated Sep. 15, 2021 in International Patent Application No. PCT/US2021/037434, pp. 1-9.
Notice of Allowance dated Feb. 12, 2020 in U.S. Appl. No. 16/190,122, pp. 2-4.
Pollalis, C., et al., "Multipath TCP Proxy: Unshackling Network Nodes from Today's End-to-End Connection Principle", In Proc. of the 14th Intl. Conf. on Wired/Wireless Internet Communication (WWIC), May 25-27, 2016, Thessaloniki, GR, pp. 55-65.
Notice of Allowance dated Oct. 14, 2021 in U.S. Appl. No. 16/902,157, pp. 2-4.

\* cited by examiner

SYSTEMS, METHODS, AND MEDIA FOR SCHEDULING TRAFFIC OF A COMMUNICATION SESSION BETWEEN AN APPLICATION ON A WIFI NETWORK AND ANOTHER DEVICE

CROSS-REFERENCE TO RELATED APPLICATION

This application claims the benefit of U.S. Provisional Patent Application No. 62/399,518, filed Sep. 26, 2016, and U.S. Provisional Patent Application No. 62/470,094, filed Mar. 10, 2017, each of which is hereby incorporated by reference herein in its entirety.

BACKGROUND

WiFi is a dominant means of connectivity, and yet despite its wide use by consumers, it remains a performance bottleneck for a vast majority of users. There are a variety of reasons that performance suffers, including varying channel quality from mobility of devices, interference among devices, and physical layer characteristics such as multipath, fading, and the rate anomaly problem. In fact, although existing commodity routers permit prioritization of sessions, they are still generally unable to maintain any guaranteed Quality of Service (QoS), even for those prioritized sessions. Even if QoS can be guaranteed at the physical or link layer, it does not translate into throughput or goodput (i.e., the rate of successful transmission after ignoring re-transmissions and any other error correction) at the transport layer due to link layer retransmissions. The impact of this unreliability is even more pronounced as WiFi is increasingly the only shared broadcast link on an end-to-end path, whereas almost everything else is switched.

Unfortunately, existing mechanisms do not sufficiently compensate for these undesirable characteristics, resulting in unpredictable performance.

SUMMARY

Systems, methods, and media for scheduling traffic of a communication session between an application on a wifi network and another device are provided. In some embodiments, a system is provided. The system schedules traffic of a communication session between an application on a WiFi network and another device. In doing so, the system receives traffic of a first communication session. The system determines that the traffic belongs to a first traffic classification and determines that a first product of a time allocated to the first traffic classification and airtime associated with a second traffic classification is at least one of less than and equal to a second product of a time allocated to the second traffic classification and airtime associated with the first traffic classification. In response to this second determining, the system selects a counter associated with the first communication session as being the largest of a plurality of counters each associated with a different communication session of a plurality of communication sessions, which plurality of communications sessions include the first communication session. Then, the system determines that the traffic of the first communication session is to be scheduled for transmission to the application over the WiFi network in response to at least the counter being determined to be the largest of the plurality of counters. Based on the traffic being determined to be scheduled for transmission, the system increases the airtime associated with the first traffic classification and decreases the counter.

DETAILED DESCRIPTION

In accordance with some embodiments, mechanisms that transparently provide Quality of Service (QoS) to applications in a WiFi environment are provided.

In accordance with some embodiments, a transparent proxy that works at the transport layer and guarantees QoS to certain applications whenever possible and abstracts away rate fluctuations in the physical layer is provided. The transparent proxy can be implemented as part of a WiFi access point, or as a separate device that sits between the access point and a wired connection, in some embodiments. The transparent proxy can provide QoS to applications connected to any WiFi access point.

Figure 1:
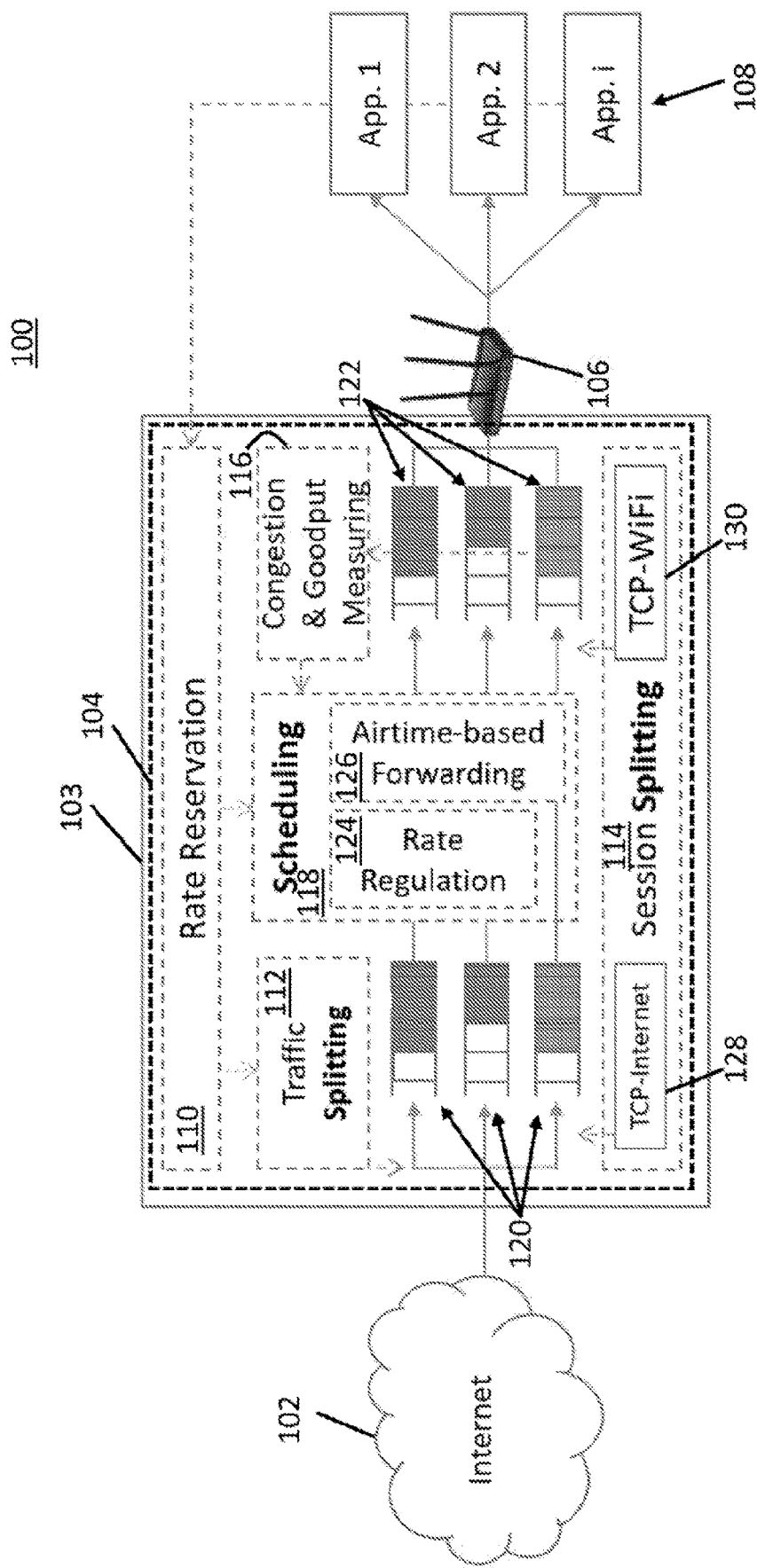
FIG. 1 is a diagram of an example of a system including a transparent proxy in accordance with some embodiments.

An example 100 of a system including the transparent proxy is shown in FIG. 1. As illustrated, system 100 includes an Internet interface 102, transparent proxy hardware 103 (which can be a general-purpose computer, a special-purpose computer, a router, or any other suitable hardware, and which may run any suitable operating system (e.g., Linux) or no operating system at all), a transparent proxy 104 (which runs on hardware 103), a WiFi access point 106 (e.g., a WiFi router), and applications 108. Applications 108 can be running on any suitable devices for accessing WiFi, such as mobile phones, laptop computers, printers, tablet computers, Internet-of-things devices, cameras, etc.

As shown in FIG. 1, transparent proxy 104 includes a rate reservation function 110, a traffic splitting function 112, a session splitting function 114, a congestion and goodput measuring function 116, a scheduling function 118, and buffers 120 and 122. Scheduling function 118 uses a rate regulation function 124 and an airtime based forwarding function 126. As shown, the session splitting function can use TCP instances (TCP-internet instance 128 and TCP-WiFi instance 130) that are provided by an operating system (e.g., Linux) in which the transparent proxy is implemented, in some embodiments.

For the purposes of clarity, FIG. 1 only shows the portion of the architecture of the transparent proxy for communication flows toward WiFi access point 106. Although not shown in FIG. 1, the functions of transparent proxy 104 can be replicated for communication flows away from WiFi access point 106, and those replicated functions can behave similarly to what is described herein for the functions shown in FIG. 1.

In some embodiments, instead of implementing the functions of transparent proxy 104 in a device separate from WiFi access point 106, these functions can be performed in WiFi access point 106 using any suitable hardware (e.g., a hardware processor) therein, and dedicated hardware for transparent proxy 104 shown in FIG. 1 can be omitted.

As the name transparent proxy suggests, transparent proxy 104 can act as a proxy between applications 108 and other devices with which they are communicating (e.g., such as servers) via a WiFi network. In doing so, communication sessions between the applications and the other devices can be split to form sessions between the applications and the proxy and to form sessions between the proxy and the other devices. This session splitting can be performed by session splitting function 114.

In some embodiments, when an application initiates a TCP or UDP session, a connection request is sent by the application via the WiFi network to hardware 103 and is redirected by routing functionality (e.g., which can be provided by the hardware's operating system (e.g., Linux)) in the hardware from going to an original destination of the connection request to going to the transparent proxy. A session is then established between the application and the proxy. At the same time, another session is also established between the proxy and the original destination.

In some embodiments, in order to redirect TCP packets, an iptables command can be sent by transparent proxy 104 to the routing function of hardware 103 to add REDIRECT rules in the routing function's PREROUTING table. The REDIRECT rules can be used to change the destination of packets from going to the original destination to going to the proxy, and from going to the application to going to the proxy, in some embodiments.

In some embodiments, in order to establish a TCP connection between the proxy and the original destination, the original destination address can be retrieved by transparent proxy 104 from the socket option using getsockopt( . . . ,SO_ORIGINAL_DST, . . . ). For this TCP connection, if the original destination address is in the WiFi network, CUBIC congestion control can be used for the connection in some embodiments. Alternatively, in some embodiments the connection can be managed by the transparent proxy as described below.

In some embodiments, for UDP packets, instead of using REDIRECT rules in the routing function of hardware 103, the TPROXY rule in iptables can be used to redirect packets. Also, in some embodiments, for UDP packets, instead of using getsockopt, and the original destination address can be retrieved from the header by calling recvmsg( ).

In some embodiments, communication sessions can be separated into multiple category service classes, such as: business class; and economy class. Although two classes are illustrated herein, it should be apparent that more classes can be used in some embodiments. In some embodiments, there can be multiple business classes, and the proxy can provide bandwidth guarantees for network sessions in each business class, while the network sessions in the economy class compete for the rest of bandwidth in an unmanaged way.

In some embodiments, the class of a session can be determined using rules based on any suitable information, such as: the application's IP address; the original destination's IP address; the original destination's port number; the protocol number; the application's MAC address; the application's device type (e.g. TV, cell phone, laptop, tablet computer, streaming media player, IP camera, Internet-of-things device, etc.); and the application's hostname. The classification rules can be pre-defined or specified by a user using a configuration user interface (e.g., which can be presented as a Web page that is hosted by the transparent proxy). For example, in some embodiments, upon receiving the suitable information, the transparent proxy can access a lookup table it maintains, or that is maintained on a remote server, to determine the classification of a session.

Note that an application may have multiple sessions and it may be hard to identify such sessions as being associated with the application only using transport layer information and network layer information. In some embodiments, any suitable tools (e.g. L7-filter, or HTTP proxy) can be used to identify an application associated with one or more sessions. In some embodiments, if an application supports HTTP proxy, the application can be configured to direct traffic to an HTTP proxy server running the operating system of hardware 103, which will then forward the traffic to the transparent proxy in a manner that identifies all of the traffic as coming from the same application.

Returning to FIG. 1, each business class session can have its own buffer 120 and its own buffer 122, while all economy class sessions can share the same buffer 120 and the same buffer 122.

In some embodiments, for each session between an original destination and the transparent proxy, a buffer 120 (which can be managed, for example, by a Linux kernel of the operation system of hardware 103) stores the data already sent by the original destination, but not yet processed by scheduling function 118.

In some embodiments, for each session between the proxy and an application, a buffer 122 (which can be managed, for example, by a Linux kernel of the operation system of hardware 103) stores the data already sent by the proxy but not ACK-ed (e.g., acknowledged by a TCP "ACK" message) yet by the application. When the Wi-Fi network is not a bottleneck, the physical transmission rate is greater than the sending rate. In this circumstance, buffers 122 will not hold data very long, and the size of the data in the buffers will be relatively small. On the other hand, when the Wi-Fi network becomes a bottleneck, the size of the data in buffers 122 will become relatively large. Congestion and goodput measuring function 116 of the proxy monitors the sum of the sizes (hereinafter, the "size-sum") of these buffers for all sessions between the proxy and the applications as compared to a threshold to indicate the conditions of Wi-Fi network.

In some embodiments, to decide if the WiFi network is under congestion, the size-sum of the buffers can be monitored using ioctl(SIOCOUTQ) on the bottleneck interface (which is either the WiFi link between WiFi access point 106 and an application 108 or the wired connection between hardware 103 and WiFi access point 106) and compare it against a threshold. Any suitable threshold can be used in some embodiments. In some embodiments, the threshold can be set to prevent under-utilization while also allowing the transparent proxy to respond after detecting congestion and before an amount of economy data can build up in the buffer that causes a head of the line blocking problem. For example, in some embodiments, the threshold can be set to max(10 KB; 0:05 s*T), where T is the measured aggregate throughput of all sessions on the WiFi network. This setting of threshold implies that, if the congestion state is triggered, the WiFi needs 0.05 s to send all the data in the WiFi part buffers, which further implies that, during a 10 ms holding time (described below), the WiFi network always has data to send.

In some embodiments, for throughput measuring, the goodput of data can be measured instead of its raw throughput. This can be accomplished by measuring on the transport layer so that only the ACK-ed data is counted in some embodiments.

In some embodiments, if the Wi-Fi network is not a bottleneck, scheduling function 118 in the proxy can forward packets from buffers 120 to buffers 122 in an unmanaged manner. Specifically, in these embodiments, whenever the proxy receives data in one of buffers 120, it forwards the data to the corresponding one of buffers 122.

In some embodiments, if the Wi-Fi network becomes a bottleneck, scheduling function 118 in the proxy can prioritize the sessions in business class using rate regulation function 124 and airtime-based forwarding function 126.

In some embodiments, using the airtime-based forwarding function 126, the proxy can prevent the economy class from getting starved even when the business class cannot be satisfied. In doing so, a portion of airtime can be reserved for the economy class so that the business class does not consume the whole network. After the business class consumes an allocated portion of the airtime, or all the sessions in business class reach desired bandwidth, the proxy can then serve the economy class.

Two counters, $airtime_b$ and $airtime_e$, can be used to record the airtime consumed by business class and economy class, respectively. Alternatively, in some embodiments, $airtime_b$ and $airtime_e$, can be used to record the bandwidth consumed by business class and economy class, respectively. In some embodiments, the airtime consumed can be based on actual transmission time which takes into the amount of data transferred and the goodput of one or more sessions. More particularly, in some embodiments, for every packet, its airtime can be estimated by (its packet length)/(data rate) in some embodiments. Here, the data rate can be set to be the measured link rate for that particular session in some embodiments.

In some embodiments, there are multiple business class sessions, each with a different desired bandwidth. In some embodiments, for each business class session, a token bucket (e.g., a counter) can be used to control the communication rate of the business class session in some embodiments. The token buckets can be initialized with some positive value, such as a percentage for the reserved rate for the corresponding business class session in some embodiments. Every byte of data sent in a business class session can decrease a token in the corresponding token bucket in some embodiments. The tokens for a given business class session can be generated at the reserved rate of that business class session in some embodiments. When there is some token in a token bucket for a business class session, it means the sending rate for that business class session is below the reserved rate, and thus the proxy will forward data for that business class session. When there is no token in a token bucket for a business class session, the desired rate for that business class session is reached, and the proxy will hold the traffic forwarding process for the business class session.

In some embodiments, when multiple token buckets contain token, the transparent proxy can select the business class sessions with maximum tokens to work.

As mentioned above, in some embodiments, the token generating rate for a business class session's token bucket can be set according to the session's reserved rate bandwidth. When doing so, the tokens will accumulate in the token bucket if the desired bandwidth is less than the reserved rate. To prevent a flow consuming too much bandwidth after a long idle period, the transparent proxy can set an upper limit on the number of tokens in a toke bucket in some embodiments. In some embodiments, the limit can be set to be 0.5 s*P, where P is the reserved rate. In some embodiments, when a business class session is selected based on airtime share but it has no packet in buffers 120, the system will hold the forwarding action for a tiny while to wait for the packets already in WiFi part buffers 122 to be sent out. In some embodiments, this delay can be any suitable duration, such as 10 ms.

Figure 2:
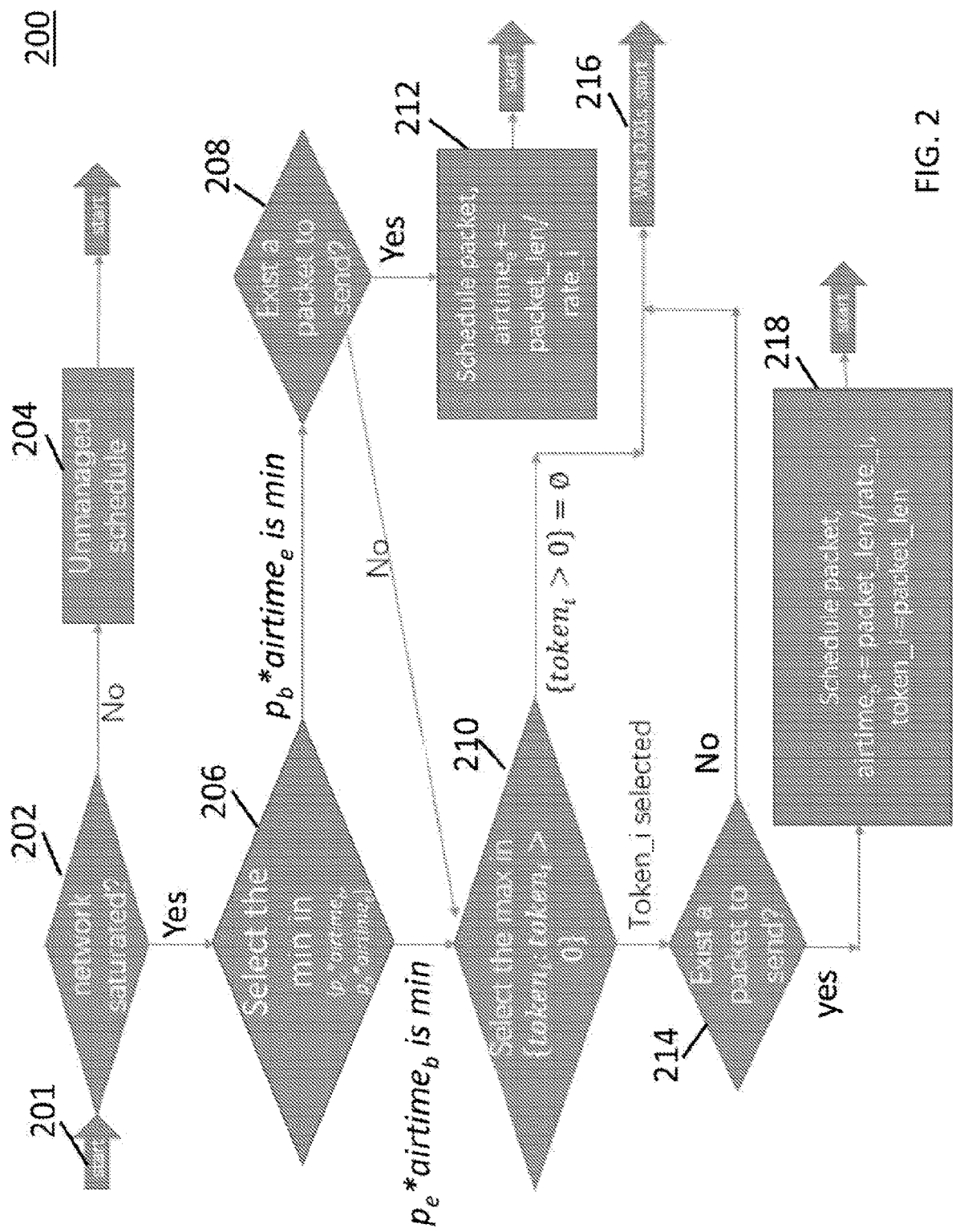
FIG. 2 is a diagram of an example of a process for a scheduling function of a transparent proxy in accordance with some embodiments.

FIG. 2 illustrates an example 200 of a process for scheduling function 118 of a transparent proxy in accordance with some embodiments. As shown, after process 200 begins at 201, the process can determine if the network is saturated at 202. If not, the process can operate on an unmanaged schedule (e.g., pass data as it is received at the proxy without any restrictions or modifications) at 204 and loop back to starting point 201.

Otherwise, at 206, the proxy can select the minimum of $p_e*airtime_b$ and $p_b*airtime_e$, where $p_b$ and $P_e$ are the desired airtime portion for business class (e.g., 0.9 or 90%) and the desired airtime portion for economy class (e.g., 0.1 or 10%), respectively. If $p_e*airtime_b$ is smaller than $p_b*airtime_e$, the proxy can determine if any token buckets have tokens, and, if so, select the token bucket with the most tokens at 210.

If there are no tokens in any buckets, then at 216, the process can sleep for a small time frame (e.g., 0.01 s as shown in FIG. 2) to wait for the data in the buffer to be processed and then loop back to 201. (Economy data may not be sent at this point, in some embodiments, because doing so may cause the buffer to fill up with economy data and business data to not get a chance to transmit.)

Otherwise, if a token bucket with tokens is selected, process 200 can determine at 214 whether a data packet for business class is waiting to be sent. If not, process will branch to 216 and proceed as described above. However, if process 200 determines at 214 that a packet is waiting, process 200 can schedule the packet to be sent, add the time for the packet (which can be determined as described above (e.g., as the packet length divided by the goodput rate)) to $airtime_b$, and decrease the token count for the bucket by the packet length at 218 and then loop back to 201.

If it is determined at 206 that $p_b*airtime_e$ is smaller than $P_e*airtime_b$, the proxy can determine whether an economy class packet is waiting to be sent at 208. If not, process 200 can branch to 210 and proceed as described above. However, if process 200 determines at 208 that an economy class packet is waiting to be sent, then process 200 can schedule the packet to be sent and add the consumed airtime (which can be determined as described above (e.g., as the packet length divided by the goodput rate)) to the $airtime_e$ counter at 212 and then loop back to 201.

While the transparent proxy has been described above as being used to control traffic between applications on a WiFi network and other devices on networks separate from the WiFi network (e.g., the Internet), in some embodiments, the transparent proxy can be used to control traffic between an application on a WiFi network and another device on the same WiFi network. In such case, the WiFi access point can be configured to act in bridge mode so that all internal WiFi network traffic is routed through the transparent proxy. For example, traffic from another device on the WiFi network traveling to an application on the WiFi network would travel from WiFi access point 106 to buffers 120 of the transparent proxy, be processed as described above by the transparent proxy, and then travel from buffers 122 to WiFi access point 106 and then to the application.

In some embodiment, the mechanisms described herein can be used in a multi-access point environment. In such environments, a common transparent proxy 104 can be used for all access points, or a different transparent proxy 104 can be used for each access point. When using a common transparent proxy, because traffic rates on each access point may be different, the transparent proxy can provide separate goodput rate monitors, token buckets, airtime counters, buffers, etc. as described above for each access point. When an application migrates from one access point to another, information necessary to perform the functions described herein (e.g., such as session goodput, airtime counters, buffer sizes, etc.) can be maintained for the flows on both access points until the migration is complete.

In some embodiments, to control uplink flows in TCP, the flow control mechanism in TCP can be used by delaying the ACK packet. In other words, by delaying ACK packets, inbound data packets can be prevented from being sent to the transparent proxy.

In some embodiments, the transparent proxy can maintain a persistent TCP pool that has one or more TCP sessions to popular sites (like GOOGLE, FACEBOOK, etc.) that are in an "established" state. When an application initiates a TCP connection to a corresponding site, the transparent proxy can split the requested TCP session (and thereby form a session between the application and the proxy) and use an existing, established TCP session from the pool to use for the connection between the proxy and the site. In this way, the transparent proxy can eliminate the delay associated with the initial handshake process with the site. This technique can also be used for video streaming devices where over-the-top streaming doesn't have as smooth an experience as cable channel switching. Using this technique, the access point can maintain a pool of active connections to popular streaming services and improve the end-user experience.

Figure 3:
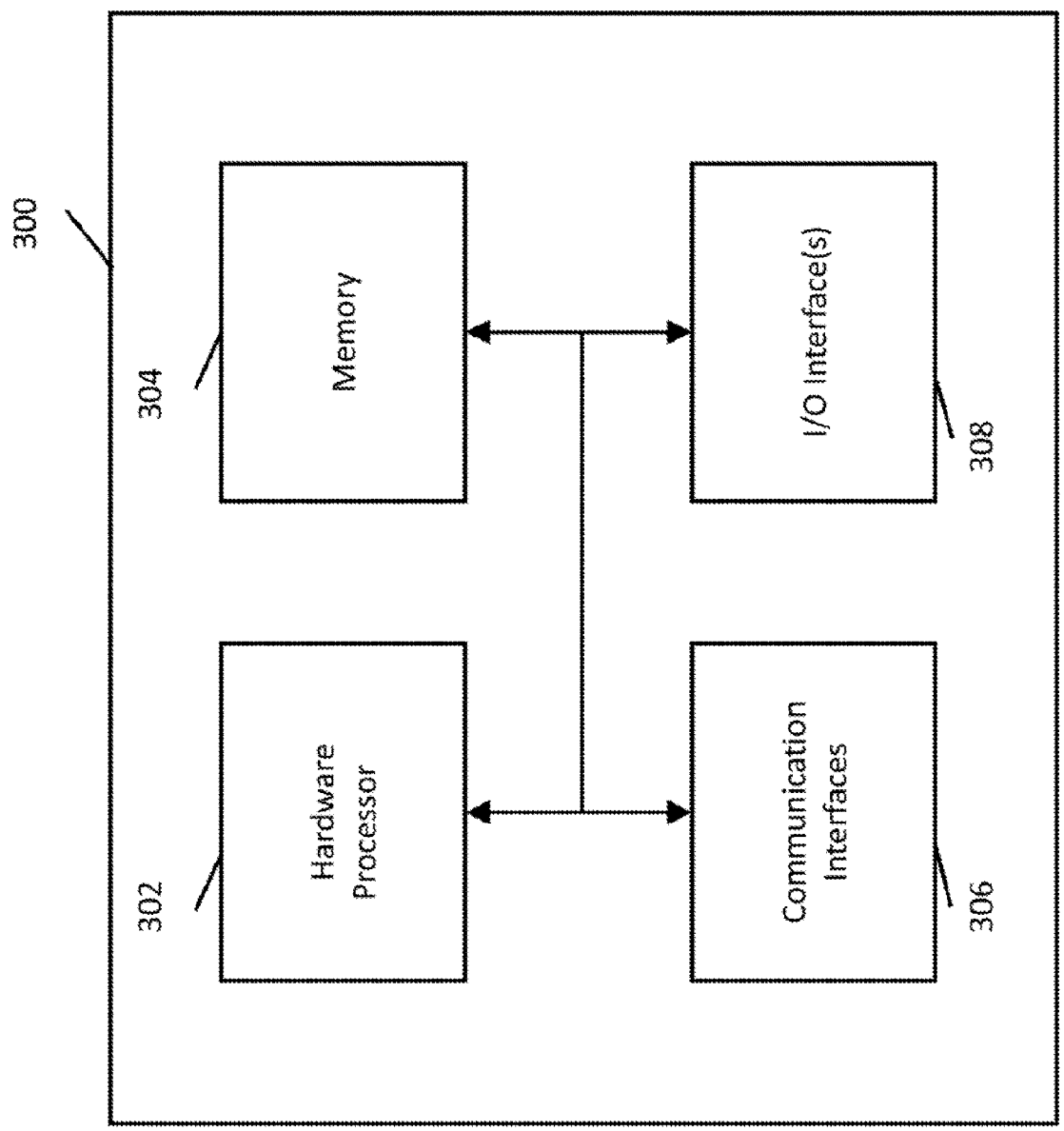
FIG. 3 is a diagram of an example of hardware on which a transparent proxy can be implemented in accordance with some embodiments.

FIG. 3 illustrates an example 300 of hardware that can be used to implement hardware 103 and/or a portion of WiFi access point 106 in accordance with some embodiments. As shown, hardware 300 can include a hardware processor 302, memory 304, communication interfaces 306, input/output interface(s) 308, and/or any other suitable components. Hardware processor 302 can be implemented using any suitable microprocessor, microcontroller, digital signal processor, field programmable gate array, dedicated logic, and/or any other hardware capable of performing the functions of the transparent proxy described herein. Memory 304 can be implemented using any suitable random-access memory (RAM), read only memory (ROM), magnetic media, optical media, etc. Communication interfaces 306 can include any suitable one-way or two-way interface(s) for communicating over wires, optical fiber, airwaves, and/or any other suitable media. Input/output interface(s) 308 can include any suitable interface for receiving user input and/or providing output including keyboards, touch screens, pointer controls (mouse, mice, track ball, stylus, track pad, etc.), displays, audio outputs, etc.

In some embodiments, any suitable computer readable media can be used for storing instructions for performing the functions and/or processes described herein. This media can be part of or separate from memory 304 in some embodiments. For example, in some embodiments, computer readable media can be transitory or non-transitory. For example, non-transitory computer readable media can include media such as non-transitory magnetic media (such as hard disks, floppy disks, etc.), non-transitory optical media (such as compact discs, digital video discs, Blu-ray discs, etc.), non-transitory semiconductor media (such as random access memory (RAM), flash memory, electrically programmable read only memory (EPROM), electrically erasable programmable read only memory (EEPROM), etc.), any suitable non-transitory media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described blocks of the process of FIG. 2 can be executed or performed in any order or sequence not limited to the order and sequence shown and described in the figure. Also, some of the above blocks of the process of FIG. 2 can be executed or performed substantially simultaneously where appropriate or in parallel to reduce latency and processing times. Furthermore, it should be noted that FIG. 2 is provided as an example only. At least some of the blocks shown in this figure may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Although the invention has been described and illustrated in the foregoing illustrative embodiments, it is understood that the present disclosure has been made only by way of example, and that numerous changes in the details of embodiment of the invention can be made without departing from the spirit and scope of the invention, which is limited only by the claims that follow. Features of the disclosed embodiments can be combined and rearranged in various ways.

What is claimed is:

1. A system for scheduling traffic of a communication session between an application on a wireless local area network and another device, comprising:
   at least one hardware processor configured to:
      receive traffic of a first communication session;
      determine that the traffic belongs to a first traffic classification;
      determine that a first product of a bandwidth allocated to the first traffic classification and bandwidth associated with a second traffic classification is at least one of less than and equal to a second product of a bandwidth allocated to the second traffic classification and bandwidth associated with the first traffic classification;
      in response to determining that the first product is at least one of less than and equal to the second product, select a counter associated with the first communication session as being the largest of a plurality of counters each associated with a different communication session of a plurality of communication sessions, which plurality of communications sessions include the first communication session;
      determine that the traffic of the first communication session is to be scheduled for transmission to the application over the wireless local area network in response to at least the counter being determined to be the largest of the plurality of counters;
      increase the bandwidth associated with the first traffic classification based on the traffic being determined to be scheduled for transmission; and
      decrease the counter based on the traffic being determined to be scheduled for transmission.

2. The system of claim 1, wherein the bandwidth allocated to the first traffic classification is a percentage of a total communication bandwidth available on the wireless local area network.

3. The system of claim 2, wherein the bandwidth allocated to the second traffic classification is a percentage of a total communication bandwidth available on the wireless local area network.

4. The system of claim 1, wherein the bandwidth associated with the first traffic classification is based a goodput of other traffic associated with the first classification.

5. The system of claim 4, wherein the bandwidth associated with the second traffic classification is based a goodput of traffic associated with the second classification.

6. The system of claim 1, wherein the at least one hardware processor is also configured to increase the counter at a rate that is based on a reserved rate of the first communication session.

7. A method of scheduling traffic of a communication session between an application on a wireless local area network and another device, comprising:
receiving traffic of a first communication session;
determining that the traffic belongs to a first traffic classification;
determining, using a hardware processor, that a first product of a bandwidth allocated to the first traffic classification and bandwidth associated with a second traffic classification is at least one of less than and equal to a second product of a bandwidth allocated to the second traffic classification and bandwidth associated with the first traffic classification;
in response to determining that the first product is at least one of less than and equal to the second product, selecting a counter associated with the first communication session as being the largest of a plurality of counters each associated with a different communication session of a plurality of communication sessions, which plurality of communications sessions include the first communication session;
determining that the traffic of the first communication session is to be scheduled for transmission to the application over the wireless local area network in response to at least the counter being determined to be the largest of the plurality of counters;
increasing the bandwidth associated with the first traffic classification based on the traffic being determined to be scheduled for transmission; and
decreasing the counter based on the traffic being determined to be scheduled for transmission.

8. The method of claim 7, wherein the bandwidth allocated to the first traffic classification is a percentage of a total communication bandwidth available on the wireless local area network.

9. The method of claim 8, wherein the bandwidth allocated to the second traffic classification is a percentage of a total communication bandwidth available on the wireless local area network.

10. The method of claim 7, wherein the bandwidth associated with the first traffic classification is based a goodput of other traffic associated with the first classification.

11. The method of claim 10, wherein the bandwidth associated with the second traffic classification is based a goodput of traffic associated with the second classification.

12. The method of claim 7, further comprising increasing the counter at a rate that is based on a reserved rate of the first communication session.

13. A non-transitory computer-readable medium containing computer executable instructions that, when executed by a processor, cause the processor to perform a method for scheduling traffic of a communication session between an application on a wireless local area network and another device, the method comprising:
receiving traffic of a first communication session;
determining that the traffic belongs to a first traffic classification;
determining that a first product of a bandwidth allocated to the first traffic classification and bandwidth associated with a second traffic classification is at least one of less than and equal to a second product of a bandwidth allocated to the second traffic classification and bandwidth associated with the first traffic classification;
in response to determining that the first product is at least one of less than and equal to the second product, selecting a counter associated with the first communication session as being the largest of a plurality of counters each associated with a different communication session of a plurality of communication sessions, which plurality of communication sessions include the first communication session;
determining that the traffic of the first communication session is to be scheduled for transmission to the application over the wireless local area network in response to at least the counter being determined to be the largest of the plurality of counters;
increasing the bandwidth associated with the first traffic classification based on the traffic being determined to be scheduled for transmission; and
decreasing the counter based on the traffic being determined to be scheduled for transmission.

14. The non-transitory computer-readable medium of claim 13, wherein the bandwidth allocated to the first traffic classification is a percentage of a total communication bandwidth available on the wireless local area network.

15. The non-transitory computer-readable medium of claim 14, wherein the bandwidth allocated to the second traffic classification is a percentage of a total communication bandwidth available on the wireless local area network.

16. The non-transitory computer-readable medium of claim 13, wherein the bandwidth associated with the first traffic classification is based a goodput of other traffic associated with the first classification.

17. The non-transitory computer-readable medium of claim 16, wherein the bandwidth associated with the second traffic classification is based a goodput of traffic associated with the second classification.

18. The non-transitory computer-readable medium of claim 13, wherein the method further comprises increasing the counter at a rate that is based on a reserved rate of the first communication session.

* * * * *